(12) United States Patent
Yan

(10) Patent No.: US 7,354,174 B1
(45) Date of Patent: Apr. 8, 2008

(54) ENERGY EFFICIENT FESTIVE LAMP

(75) Inventor: Ellis Yan, Auburn, OH (US)

(73) Assignee: Technical Consumer Products, Inc., Aurora, OH (US)

(*) Notice: Subject to any disclaimer, the term of this patent is extended or adjusted under 35 U.S.C. 154(b) by 79 days.

(21) Appl. No.: 11/293,551

(22) Filed: Dec. 5, 2005

(51) Int. Cl.
F21S 13/14 (2006.01)
F21V 1/00 (2006.01)

(52) U.S. Cl. ............ 362/252; 362/240; 362/238; 362/806; 313/512; 313/634; 315/185 S; 315/200 A

(58) Field of Classification Search ........ 362/252, 362/240, 238, 800, 806; 313/500, 512, 634; 315/185 S, 200 A
See application file for complete search history.

(56) References Cited

U.S. PATENT DOCUMENTS

| | | | |
|---|---|---|---|
| 4,161,021 A * | 7/1979 | George, Jr. ............ 362/252 |
| 4,211,955 A * | 7/1980 | Ray ...................... 315/53 |
| 5,585,783 A * | 12/1996 | Hall ..................... 340/473 |
| 5,718,502 A | 2/1998 | Tseng | |
| 5,806,965 A * | 9/1998 | Deese .................. 362/249 |
| 6,218,785 B1 * | 4/2001 | Incerti ................. 315/185 S |
| 6,227,679 B1 | 5/2001 | Zhang et al. | |
| 6,371,636 B1 * | 4/2002 | Wesson ................ 362/545 |
| 6,523,978 B1 * | 2/2003 | Huang .................. 362/252 |
| 6,580,228 B1 * | 6/2003 | Chen et al. ........... 315/185 R |
| 6,621,222 B1 * | 9/2003 | Hong .................... 315/51 |
| 6,659,632 B2 | 12/2003 | Chen | |
| 6,709,132 B2 | 3/2004 | Ishibashi | |
| 6,948,829 B2 | 9/2005 | Verdes et al. | |
| 2002/0070643 A1 * | 6/2002 | Yeh ..................... 313/25 |
| 2004/0264182 A1 * | 12/2004 | Tang .................... 362/208 |

* cited by examiner

Primary Examiner—Jacob Y. Choi
(74) Attorney, Agent, or Firm—Joseph H. Taddeo

(57) ABSTRACT

The present invention relates to a novel energy saving decorative festive lamp that is ideally suited for use in clubs, restaurants, or decorative applications, where specialized lighting, such as rapid flashing or frequent starts, is required. It may be used with hanging chandeliers for a spectacular display of dazzling illumination sources or because of its low power consumption, may find application as a nightlight or to illuminate hallways and stairwells. Each lamp consumes only one watt, is energy efficient and has a long-life, lasting up to 50,000 hours. The outer glass envelope covering the LED array is preferably transparent, whereas the LEDs are available in the following colors: red, blue, green, amber, and white. This energy saving lamp operates efficiently at 1 watt or less to produce an illuminance greater than 25,000 mcd from a string of 10 LEDs, or greater than 37,500 mcd from a string of 15 LEDs, when contained in a transparent cover.

18 Claims, 4 Drawing Sheets

ENERGY EFFICIENT FESTIVE LAMP

FIELD OF INVENTION

The present invention relates to a decorative festive lamp, and more particularly to an energy efficient decorative festive lamp, having an enclosed string of serially connected light emitting diodes (LEDs). The string in each lamp is arranged helically wound, spirally descending about the centralized connection posts in a spatially spheroidal arrangement, brilliantly displaying the plurality of LEDs in a single lamp housing, where this festive lamp finds use in celebratory or decorative applications.

BACKGROUND OF THE INVENTION

Strings of decorative lamps have been used for festive occasions to decorate Christmas trees on Christmas Day. The random arrangement of the decorative lamps, being miniature sources of light, contributes, to sponsoring joyful events. With the advent of a new generation of light emitting diodes (LEDs), a large variety of decorative lamps have been made available to replace the older, inefficient tungsten bulbs.

By still further miniaturizing the individual LEDs and placing a group of these light emitting diodes in a decorative transparent protective housing, a similar effect of creating a celebratory mood may be attained.

Prior art strings of individual lamps using LEDs can provide a joyful effect for a festive occasion, but may be generally limited to provide illumination for a particular number of days, such as at Christmas time. Still other prior art LED lamps provide concentrated sources of illumination primarily as replacements for tungsten lamps and are not necessarily suitable for a festive and joyful occasion.

The following prior art discloses the various aspects in the design of a decorative, festive LED lamp.

U.S. Pat. No. 5,718,502, granted Feb. 17, 1998, to J. Tseng, discloses a decorative lamp for festive occasions, whose lamp base can enclose not only wires of a regular diameter, but also wires with a larger diameter, is disclosed. The decorative lamps for festive occasions includes a lamp head having a bulb and a pair of first wires and a second wire extending therefrom. A hollow lamp base receives the lamp head and secures the first and second wires of the lamp head. The lamp base has defined on a lower portion of an inner wall thereof a pair of first recesses at one side for receiving the first wires and a second recess opposed to the first recesses for receiving said second wire, such that the first and second wires are arranged in a tri-lobic disposition. The decorative lamp for festive occasions further includes a block mounted within the hollow lamp base for preventing water from entering the lamp base and so providing a short circuit.

U.S. Pat. No. 6,227,679, granted May 8, 2001, to Z. K. Zhang, et al., discloses an LED light bulb for use as an indicator or warning lamp comprises a support structure; a generally circular and planar disc attached to the support structure, wherein the disc is a printed circuit board and is perpendicularly oriented with respect to the structure. A plurality of interconnected LEDs are concentrically mounted on the disc wherein a portion of the LEDs are outwardly splayed at an angle away from a central axis point of the disc so that the LEDs collectively transmit light having about the same light intensity at viewing angles from about 0 degrees to about 360 degrees about the disc. The LED light bulb has circuitry means for providing a current to the LEDs.

U.S. Pat. No. 6,659,632, granted Dec. 9, 2003, to H. Chen, discloses a light emitting diode lamp includes multiple LED members, a plane circuit board, an LED fixing cover, a circuit board mounting seat, a drive circuit, and an LED lamp base having a bulb copper head. The plane circuit board is initially cut to form a multiple-ring shape. Then, the multiple LED members are arranged and soldered on the plane circuit board. Then, the circuit board mounting seat is mounted on the bottom of the plane circuit board, thereby forming a spatial shape having a convex arcuate face. Then, the plane circuit board and the circuit board mounting seat are mounted in the LED lamp base. Then, the LED fixing cover is mounted on the LED lamp base, thereby assembling the light emitting diode lamp that may be available for the present filament bulb seat.

U.S. Pat. No. 6,709,132, granted Mar. 23, 2004, to K. Ishibashi, discloses an LED bulb having a higher distribution of luminous intensity that is close to those of tungsten bulbs. Of which, the problem in directivity of the prior art LED bulbs has been solved while maintaining the advantages of an LED, that is, a long life and an energy saving characteristic.

U.S. Pat. No. 6,948,829, granted Sep. 27, 2005, to A. Verdes, et al., discloses a light emitting diode (LED) light bulb that includes plural individual elements as sub-assembly elements of the overall light bulb. Different sub-assembly elements of a lens, a LED printed circuit board, a housing also functioning as a heat sink, a lower housing, and other individual sub-assembly components are utilized. The LED printed circuit board sub-assembly containing the LEDs can also be provided relatively close to a base.

What is needed is a modular, decorative festive LED lamp that is comprised of a plurality of sources of illumination, connected serially, positioned in a random spatially spheroidal arrangement, when viewed, that is helically wound, and enclosed in a transparent protective container. In this regard, the present invention fulfils this need.

It is therefore an object of the present invention to provide a modular, decorative festive LED lamp, whose plurality of colored sources of illumination is a helically wound serial string of light emitting diodes that when viewed, appear to be positioned or arrayed in a random spatially spheroidal arrangement.

It is another object of the present invention to provide a modular, decorative festive LED lamp, whose plurality of colored sources of illumination is a helically wound serial string of LED bulbs that when viewed, appear to be positioned in a random spatially spheroidal arrangement, the string spirally descending about the centralized connection posts.

It is still another object of the present invention to provide a modular, decorative festive LED lamp, whose plurality of colored sources of illumination is a helically wound serial string of LED bulbs that when viewed, appear to be positioned in a random spatially spheroidal arrangement, the string spirally descending about the centralized connection posts, brilliantly displaying the plurality of LEDS in a single, colorful, protective lamp housing.

It is still yet another object of the present invention to provide a modular, decorative festive LED lamp, comprising a plurality of a helically wound serial string of colored light emitting diodes, the energy saving lamp operating efficiently at 1 watt or less to produce an illuminance greater than 25,000 millicandela (mcd), (i.e. 10 LEDs), when contained in a transparent envelope.

Yet still another object of the present invention is to provide a modular, decorative festive LED lamp, comprising a plurality of a helically wound serial string of colored light emitting diodes, the light emitting diodes being current limited to prevent thermal runaway.

A further object of the present invention is to provide a modular, decorative festive LED lamp, comprising a plurality of a helically wound serial string of colored light emitting diodes, the light emitting diodes being enclosed in a protective cover to isolate the diodes from coming in contact with ones hands or with a flammable material, in the event these diodes should experience a high temperature.

An additional object of the present invention is to provide a circuit that will permit the plurality of serially connected light emitting diodes to be operated in a rapid flashing or frequent starting mode.

A final object of the present invention is to provide a circuit that will permit the plurality of serially connected light emitting diodes to be operated at an increased frequency to reduce the flicker emanating from the LEDs.

A better understanding of these and other objects and advantages of the present invention will be best understood from the following description of the specific embodiments when read and understood in connection with the accompanying drawings.

SUMMARY OF THE INVENTION

The LG16, LG25 and LG40 family of festive lamps is ideally suited for use in clubs, restaurants, or decorative applications, where specialized lighting, such as rapid flashing or frequent starts, is required. One particular application is for use with hanging chandeliers, where a plurality of lamps renders a spectacular display of dazzling colored illumination sources. Because of its low power consumption, this festive lamp also finds application as a night-light or as a lamp to illuminate hallways and stairwells.

Each lamp consumes only one watt, is energy efficient and has a long-life, lasting up to 50,000 hours. In the preferred embodiment, it is available in a medium or candelabra base and for 24 VAC or 120 VAC applications. The outer glass envelope covering the LED array is available preferably in a clear untinted glass and the LEDs used in these novel festive lamps are available in the following colors: red, blue, green, amber, and white.

The LG16 lamp is comprised of ten serially connected LED's; the LG 25 having fifteen serially connected LED's and the LG 40 comprised of 15 LED's connected in series.

This energy saving lamp operates efficiently at 1 watt or less to produce an illuminance greater than 25,000 millicandela (mcd), (i.e. 10 LEDs), or 37,500 millicandela from a string of 15 LEDs, when contained in a transparent cover. (A candela is the base unit of luminous intensity in the International System of Units that is equal to the luminous intensity in a given direction of a source which emits monochromatic radiation of frequency 540×1012 hertz and has a radiant intensity in that direction of 1/683 watt per unit solid angle. It is also referred to as a candle, having an abbreviation of cd.)

BRIEF DESCRIPTION OF THE DRAWINGS

The figures shown in the accompanying drawings are described briefly as follows.

Other objects and advantages of the present invention will become more apparent upon reading the following detailed description when taken in conjunction with the accompanying drawings.

DETAILED DESCRIPTION OF THE PRESENT INVENTION

Figure 1:
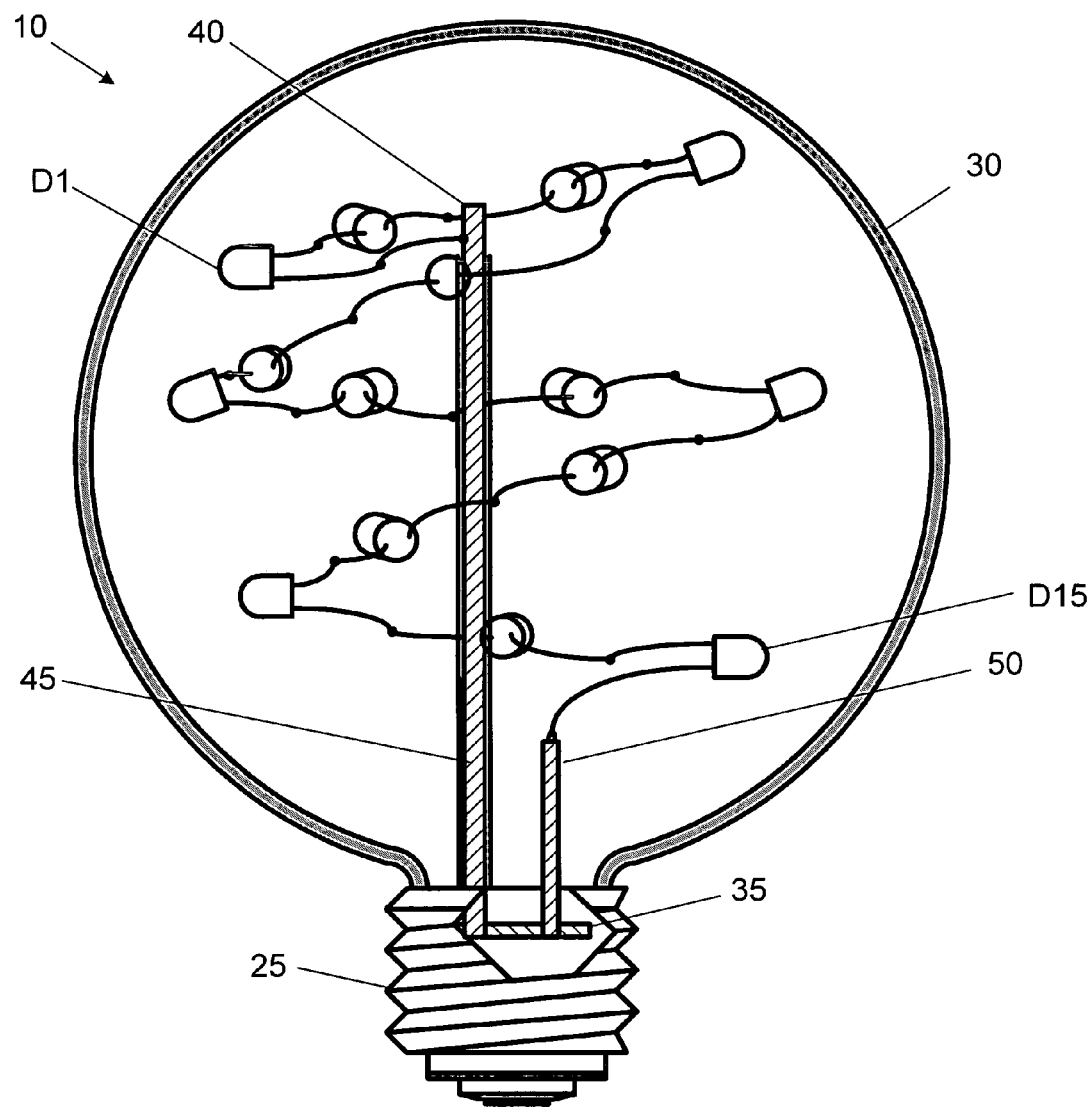
FIG. 1 is a side sectional view of an embodiment of the decorative festive lamp of the present invention taken through section 1-1 of FIG. 2, where in this embodiment a candelabra base is shown.
Figure 2:
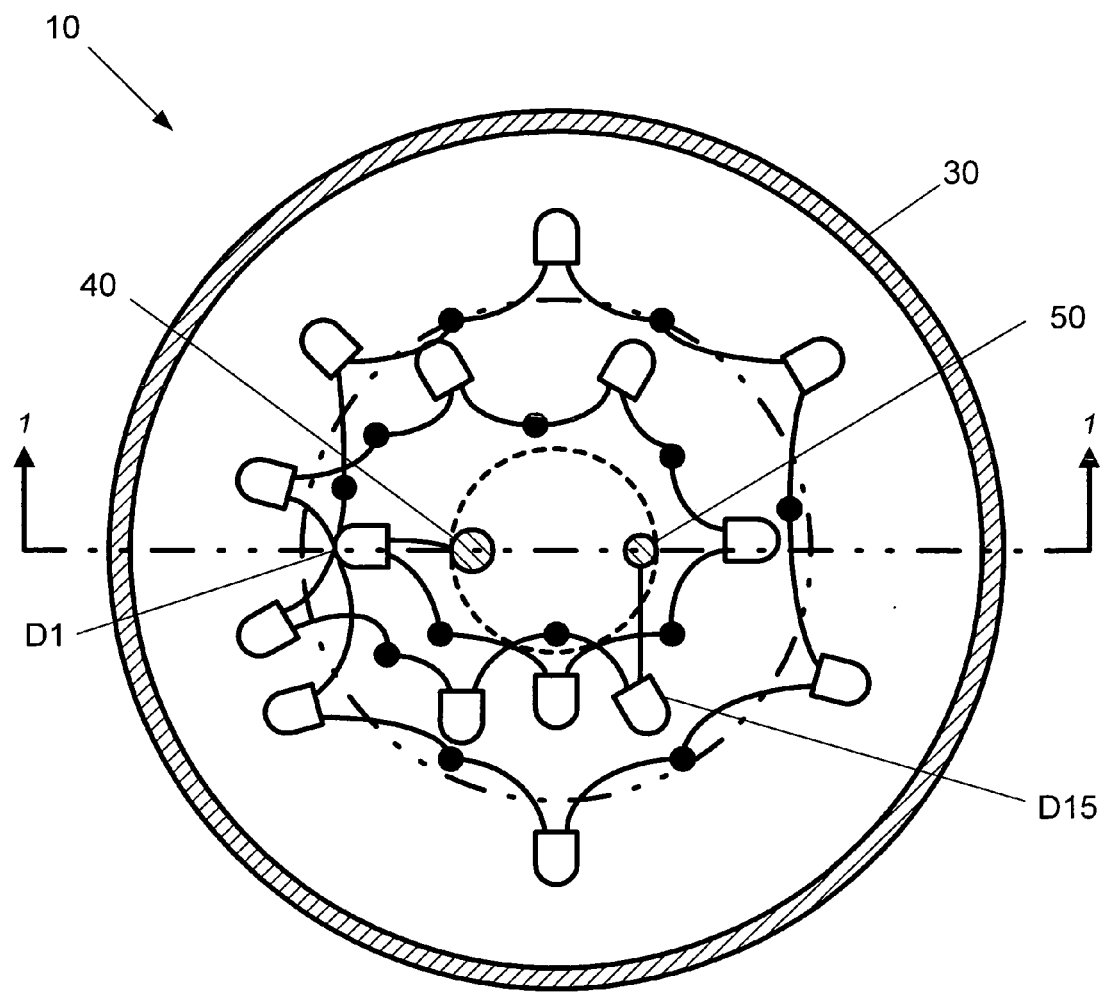
FIG. 2 is a top elevational view of the decorative festive lamp of an embodiment of the present invention illustrating a typical modular arrangement.

There is shown in FIGS. 1 and 2, an embodiment of the present invention that is described below.

FIG. 1 is a side sectional view of a first embodiment of the present invention showing in detail the spheroidally wound string of LED diodes and FIG. 2, a top view showing in detail the circular arrangement of the helically wound string of LED diodes.

Shown in FIG. 1 is the candelabra base 25 and a transparent cover 30. A circuit board 35, containing a bridge rectifier and reactive components, support the internal conducting rods 40 and 50. Conducting rod 40 is a rod that is coated with an insulating layer of Teflon® 45 to serve as a protective coating to prevent arcing or physical contact in the event of a physical failure, whereas conducting rod 50 remains uncoated.

A plurality of serially connected LEDs provides the source of illumination. In one embodiment, the string of LEDs is comprised of preferably 15 LEDs, and in another embodiment, 10 LEDs comprise the string of LEDs. Each string of LEDs is arranged so that the geometrical shape formed by the LEDs is spheroidal—formed to match the interior globular shape of the transparent cover. The LEDs are available in the following colors: red, blue, green, amber and white.

Connected between conducting rods 40 and 50 is a string of serially joined LEDs where each LED is joined to an adjacent LED by twisting the ends of the leads about two and one-half turns, snipping off the twisted ends to give a neat appearance, then soldering the joined twisted-lead connection. The string of serially joined light emitting diodes is then formed into a circular array of two and one-half turns that is arranged in a spiral, which when joined to conducting rods 40 and 50, descend spirally in the form of a helix about these conducting rods.

The helix thus formed is preferably not formed having a constant radius, but by forming the first turn and the final half turn with having about the same radius, whereas the centrally located second turn formed with having an expanding, then contracting radius to give the serial array of LEDs the illusion of a spheroidal shape.

Once the string is formed into what appears to be a spheroidal shape, the end leads of first and the last LED in the string are soldered to the connecting rods 40 and 50. In the forgoing example, the end lead of diode D1 is soldered to the end of the post 40 and the end lead of diode D15 is soldered to the end of the post 50.

Upon completion of the electrical assembly, a transparent globular cover is threaded over the assembled array until it meet with the base 25, where it is cemented in place.

Each lamp consumes less than one watt, and has a long-life, lasting up to 50,000 hours. The lamp is provided having a standard candelabra or medium base and for use in 120 VAC or 24 VAC applications. The outer glass envelope covering the LED array is available in a clear transparent housing and the light emitting diodes are available in the following colors: red, blue, green, amber, and white.

This energy saving lamp operates efficiently at 1 watt or less to produce an illuminance greater than 25,000 millicandela (mcd), (i.e. 10 LEDs), or 37,500 millicandela from a string of 15 LEDs, when contained in a transparent cover. (A candela is the base unit of luminous intensity in the International System of Units that is equal to the luminous intensity in a given direction of a source which emits monochromatic radiation of frequency 540×1012 hertz and has a radiant intensity in that direction of ⅟₆₈₃ watt per unit solid angle. It is also referred to as a candle, having an abbreviation of cd.)

Figure 3:
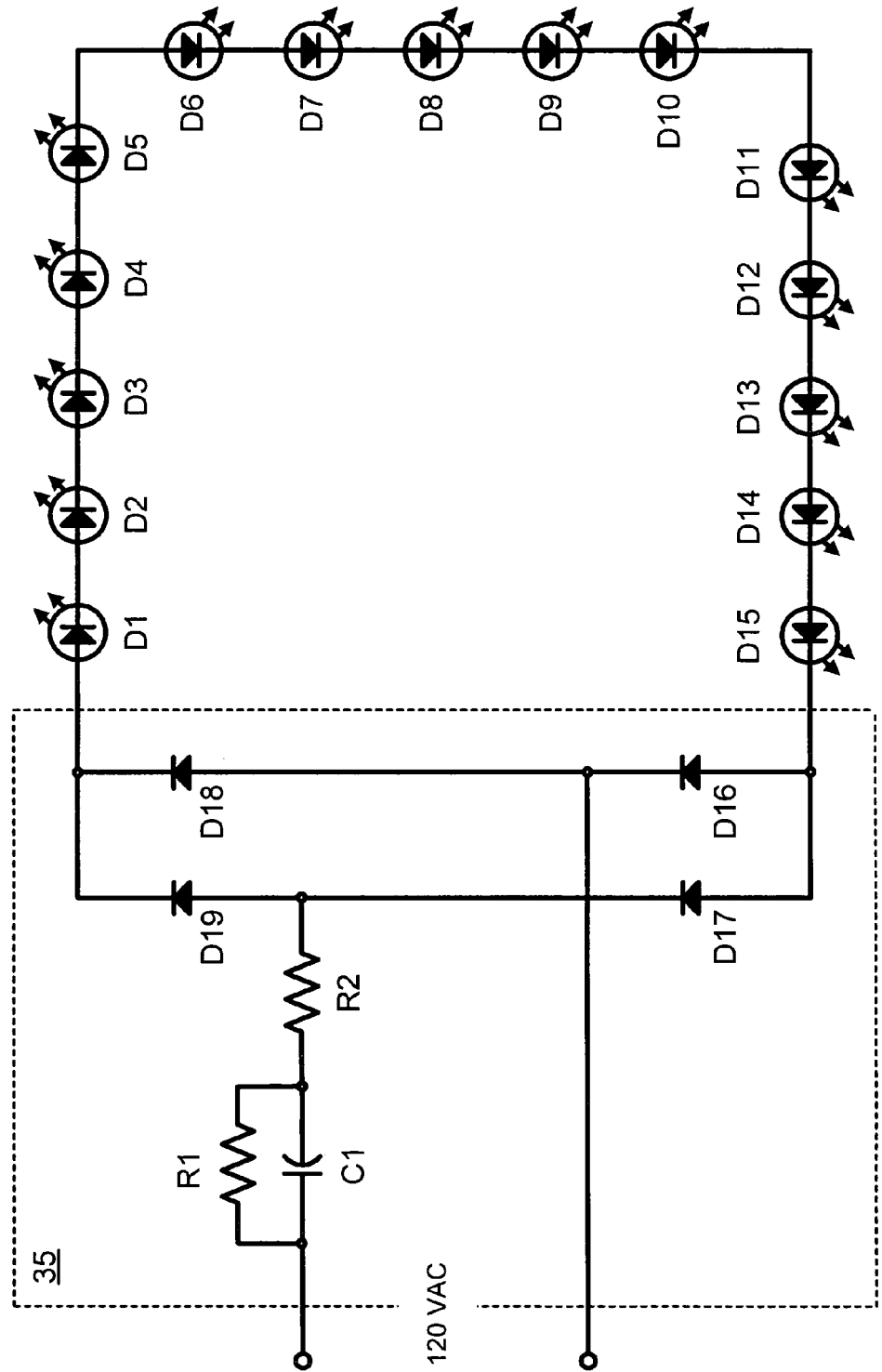
FIG. 3 is a typical detailed schematic of the decorative festive lamp of the preferred embodiment of the present invention.

Turning now to the schematic drawing shown in FIG. 3, there is detailed the circuit board 35 and the serially connected string of light emitting diodes, D1 through D15.

The circuit board 35 is comprised of resistors R1 and R2, capacitor C1, and rectifiers D16 through D19. R1 is preferably a 470K Ω ¼ W resistor and R2, a 560Ω ½ W resistor; C1 is preferably a 0.47 µF 250 V capacitor, and rectifiers D16-D19, preferably 1N4005.

Capacitor C1 serves to function as a dissipationless reactive coupling element, which is unlike that of a dissipative resistive element, thereby preserving the efficiency of this energy saving lamp. Resistor R1 merely enhances the discharging and recovery rate of capacitor C1 for aiding in applications requiring rapid flashing or frequent starts.

Resistor R2 is used to act as a current limiting element in the event of a solid state failure, thereby preventing thermal runaway The rectifier bridge comprised of diodes D16, D17, D18 and D19, serve to provide a raw, unfiltered DC voltage that is applied to the LED string. The discrete absence of a filter capacitor allows the LED string to perform in rapid flashing and in frequent starting applications.

This rectifier bridge also serves to provide a doubled frequency of operation to the LED string, thereby reducing the flicker emanating from the optical lighting source—the frequency being 120 Hertz as derived from the 120 VAC 60 Hertz source.

Figure 4:
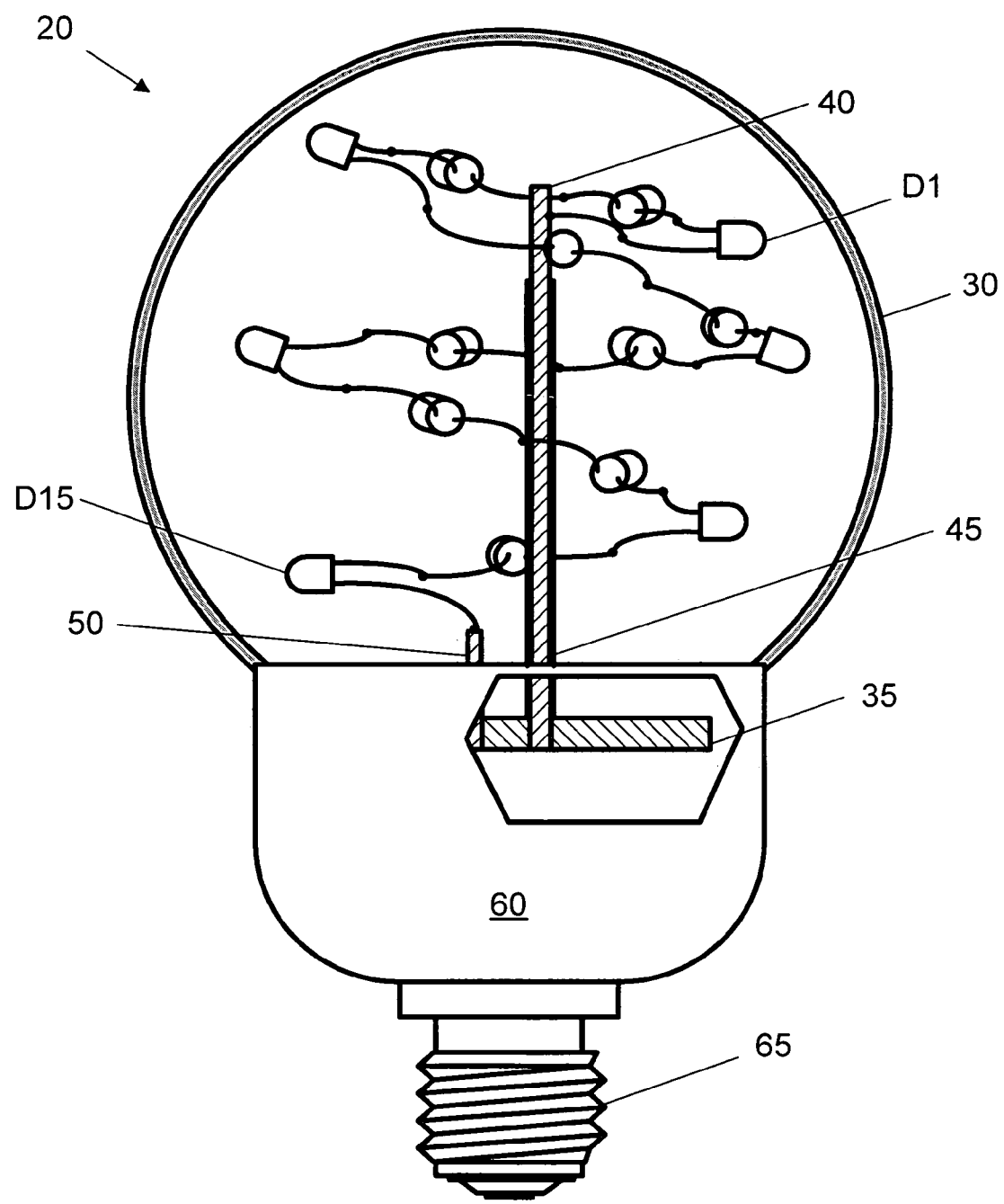
FIG. 4 is a side sectional view of a medium based decorative festive lamp of another embodiment of the present invention.

There is shown in FIG. 4 still another embodiment of the present invention showing in detail the spheroidally wound string of colored LEDs.

This embodiment depicts the decorative festive lamp having a medium base 65, a circuit housing 60 and a transparent cover 30. A circuit board 35, containing a bridge rectifier and reactive components, support the internal conducting rods 40 and 50. Conducting rod 40 is a rod that is coated with an insulating layer of Teflon® 45 to serve as a protective coating to prevent arcing or physical contact in the event of a physical failure, whereas conducting rod 50 remains uncoated.

Whereas the present invention is described in detail for its particular embodiments, there may be other variations and modifications that will become apparent to those who are skilled in the art upon reading this specification, and that these modifications or variations can be made without detracting from the true spirit of this invention.

The invention claimed is:

1. A modular light emitting diode (LED) lamp, comprising a plurality of colored sources of illumination in an arrangement of a helically wound, serial string of light emitting diodes; wherein the LEDs are arrayed in a random spatially spheroidal arrangement and a circuit board supports a pair of upright, internal conducting rods, the first conducting rod of the pair is coated with an insulating layer of Teflon® to serve as a protective coating to prevent arcing or physical contact in the event of a failure, while the second conducting rod of the pair remains uncoated.

2. The modular LED lamp as recited in claim 1, wherein the serial string of light emitting diodes is current limited to prevent thermal runaway.

3. The modular LED lamp as recited in claim 2, wherein the LED lamp receives power through a circuit having a means for reducing flicker emanating from the LEDs.

4. The modular LED lamp as recited in claim 3, wherein the circuit board comprises a first resistor and a capacitor in parallel, connected serially to a second resistor; wherein the capacitor provides a dissipationless, voltage dropping, reactive coupling element, for energy conservation.

5. The modular, decorative festive LED lamp as recited in claim 4, wherein the LED lamp comprises an energy saving lamp that operates efficiently at 1 watt or less.

6. The modular LED lamp as recited in claim 5, wherein the first resistor element enhances a discharge and recovery rate of the capacitor to aid in applications that require rapid flashing or frequent starts.

7. The modular LED lamp as recited in claim 6, wherein the second resistor provides a current limiting element in the event of a solid state failure, thereby preventing a thermal escape and consequent damage to the LED string.

8. The modular LED lamp as recited in claim 7, wherein the capacitor and resistors are succeeded by a rectifier bridge that provides an unfiltered DC voltage for application to the LED string without a filter capacitor, thereby enabling the LED string to perform in rapid flashing and in frequent starting applications.

9. The modular LED lamp as recited in claim 8, wherein the rectifier bridge comprises a first pair of diodes in parallel with a second pair of diodes that provides a doubled frequency of operation to the LED string, thereby reducing the flicker emanating from the LED string.

10. The modular LED lamp as recited in claim 9, wherein each LED is joined to an adjacent LED by ends of the leads that are twisted in essentially two and one-half turns, snipped off for a neat appearance, and soldered to form a joined twisted-lead connection.

11. The modular LED lamp as recited in claim 10, wherein the string of serially joined light emitting diodes is formed into a circular array of two and one-half turns that is arranged in a spiral, which when joined to the conducting rods, descends spirally in the form of a helix about these conducting rods.

12. The modular LED lamp as recited in claim 11, wherein a radius of the helix is not a constant radius, but the first turn and the final half turn formed with essentially the same radius, and a centrally located second turn formed with an expanding, then contracting radius to give the serial array of LEDs an apparent spheroidal shape.

13. The modular LED lamp as recited in claim 12, wherein the string of serially joined LEDs is connected between the conducting rods, a first end lead of a first LED in the string is soldered to the first connecting rod and a last end lead of a last LED, in the string is soldered to the second connecting rod.

14. The modular LED lamp as recited in claim 13, wherein the LED string is encased in a transparent protective lamp housing envelope, that isolates the diodes from coming into contact with ones hands or with a flammable material, in the event the diodes should experience a high temperature.

15. The modular LED lamp as recited in claim 14, wherein the lamp produces an illuminance greater than 25,000 millicandela (mcd), while contained in the transparent housing envelope.

16. The modular LED lamp as recited in claim 15, wherein the lamp is constructed using LEDs of a single illumination color selected from the group consisting of red, blue, green, amber and white.

17. The modular LED lamp as recited in claim 16, wherein the lamp is mounted on a candelabra base.

18. The modular LED lamp as recited in claim 16, wherein the lamp includes a circuit housing and is mounted on a medium base.

* * * * *